United States Patent
Kubota et al.

(10) Patent No.: US 6,821,104 B2
(45) Date of Patent: Nov. 23, 2004

(54) DIE CLAMPING APPARATUS AND METHOD, AND METHOD FOR ADJUSTMENT TO DIE THICKNESS USING SAID APPARATUS

(75) Inventors: Koji Kubota, Aichi-ken (JP); Saburo Fujita, Aichi-ken (JP); Toshimichi Sugita, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 222 days.

(21) Appl. No.: 10/148,905

(22) PCT Filed: Oct. 23, 2001

(86) PCT No.: PCT/JP01/09270

§ 371 (c)(1),
(2), (4) Date: Jun. 20, 2002

(87) PCT Pub. No.: WO02/34498

PCT Pub. Date: May 2, 2002

(65) Prior Publication Data

US 2002/0180132 A1 Dec. 5, 2002

(30) Foreign Application Priority Data

Oct. 23, 2000 (JP) ..................... 2000-322175

(51) Int. Cl.⁷ ............................................. B29C 45/64
(52) U.S. Cl. .................. 425/150; 264/40.1; 264/328.1; 425/171; 425/451.2; 425/590
(58) Field of Search ............................... 425/150, 171, 425/451.2, 590; 264/40.1, 328.1

(56) References Cited

U.S. PATENT DOCUMENTS

| | | | |
|---|---|---|---|
| 3,940,930 A | | 3/1976 | Rosander |
| 4,021,181 A | * | 5/1977 | Hehl ........................ 425/451.2 |
| 4,235,088 A | | 11/1980 | Kreiskorte |
| 5,320,517 A | * | 6/1994 | Hirata et al. ................ 425/590 |
| 5,422,060 A | | 6/1995 | Nakamura |
| 5,773,050 A | * | 6/1998 | Wohlrab ...................... 425/590 |

FOREIGN PATENT DOCUMENTS

| | | |
|---|---|---|
| DE | 51 182 | 3/1890 |
| DE | 4243735 | 7/1993 |
| JP | 4-364917 | 12/1992 |
| JP | 7-186217 | 7/1995 |
| JP | 8-276482 | 10/1996 |
| JP | 2000-5863 | 1/2000 |
| JP | 2000-190370 | 7/2000 |

OTHER PUBLICATIONS

Patent Abstracts of Japan, JP 07–125027, May 16, 1995.
Patent Abstracts of Japan, JP 01–192519, Aug. 2, 1989.

* cited by examiner

*Primary Examiner*—James P. Mackey
(74) *Attorney, Agent, or Firm*—Oblon, Spivak, McClelland, Maier & Neustadt, P.C.

(57) ABSTRACT

In a die clamping apparatus for an injection molding machine or the like, die clamping means for coupling and pressing a moving die plate 9 to a fixed die plate via a tie bar 15 has a die clamping cylinder consisting of two stages of a large-diameter cylinder 11 and a small-diameter cylinder 31 and a ram formed into two stages of a large-diameter ram 13 and a small-diameter ram 25. The large-diameter ram 13 is inserted in the large-diameter cylinder 11, and the small-diameter ram 25 is inserted in the small-diameter cylinder 31. The proximal end portion of the tie bar 15 is connected directly to the small-diameter ram 25. Large oil chambers 11c and 11d are provided on both sides of the large-diameter ram 13, and a small oil chamber 11e is provided on the tie bar connection side of the small-diameter ram 25. An oil pressure is supplied appropriately to each of the large oil chambers and the small oil chamber in the die clamping cylinder to appropriately move the tie bar 15.

The apparatus constructed as described above can be manufactured at a low cost, and useless time for eliminating a gap between a ring grooves in the tie bar and an engagement teeth of half nuts caused by the adjustment to die thickness can be reduced.

5 Claims, 4 Drawing Sheets

DIE CLAMPING APPARATUS AND METHOD, AND METHOD FOR ADJUSTMENT TO DIE THICKNESS USING SAID APPARATUS

TECHNICAL FIELD

The present invention relates to a die clamping apparatus, a die clamping method, and a method for adjustment to die thickness using the die clamping apparatus, which are used for an injection molding machine or the like.

BACKGROUND ART

Conventionally, there is available a die clamping apparatus for an injection molding machine, which includes a fixed die plate for holding a fixed die, a moving die plate for holding a moving die, displacing means for advancing and retreating the moving die plate with respect to the fixed die plate, and die clamping means for coupling and pressing the moving die plate to the fixed die plate via a tie bar.

In the die clamping apparatus of this type, when a molten material is injected, a high die clamping force is required in order to restrain the opening of die due to the pressure in the die, and on the other hand, when a product is taken out, it is required to open the die by moving it rapidly through a necessary distance.

Therefore, the conventional die clamping apparatus is configured so that the moving die plate is advanced or retreated with respect to the fixed die plate by using a hydraulic cylinder with a small diameter and a long stroke, whereby the die can be moved rapidly when a product is taken out.

Also, conventionally, there has been used a system in which a die clamping cylinder with a large diameter and a short stroke is provided to derive a high die clamping force during the die clamping operation, and an oil pressure is applied to a large-diameter ram in the die clamping cylinder, whereby the moving die plate is coupled and pressed to the fixed die plate via the tie bar with a high die clamping force.

In the die clamping apparatus as described above, when the die is replaced by another die with a different thickness, the position of the moving die plate at the time of die closure and opening changes, and accordingly the connecting position of the moving die plate and the tie bar also changes. Therefore, each time the die is replaced, it is necessary to change the position of the moving die plate to adjust the connecting position of the moving die plate and the tie bar.

Thereupon, various methods for adjustment to die thickness have been proposed in which the connecting position of the moving die plate and the tie bar can be adjusted in response to the replacement of die by a die with a different thickness.

Hereunder, as an example of the adjusting method, the case of a die clamping apparatus described in Japanese Patent Provisional Publication No. 8-276482 (No. 276482/1996) will be explained.

Figure 4:
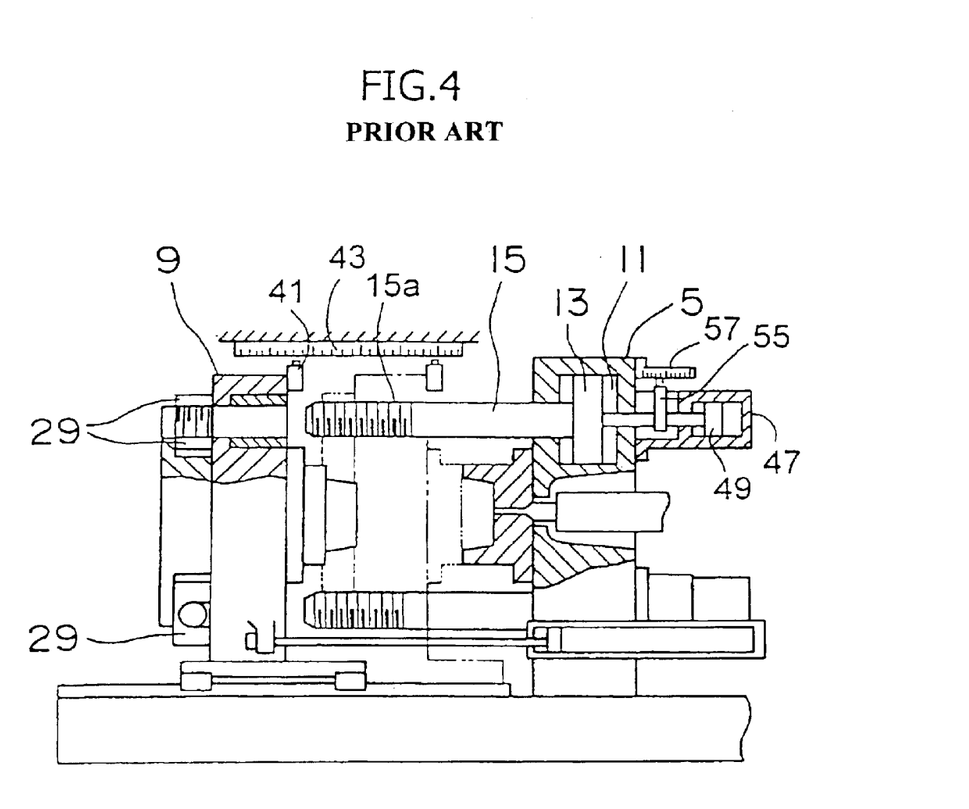
FIG. 4 is partially sectioned side view showing one example of a conventional die clamping apparatus.

FIG. 4 shows a die clamping apparatus for an injection molding machine described in the aforementioned Publication and, more particularly, a typical die clamping apparatus provided with a device for adjusting the position of a moving die plate.

This die clamping apparatus has means for coupling and pressing a moving die plate 9 to a fixed die plate 5 via a plurality of tie bars 15. This coupling/pressing means includes die clamping cylinders 11 incorporated in the fixed die plate 5, the tie bars 15 each of which is connected directly to a ram 13 in the die clamping cylinder 11 and has ring grooves 15a at the distal end portion thereof, and half nuts 29 installed on the moving die plate 9. The half nuts 29 can position the moving die plate 9 by being engaged with the ring grooves 15a in the tie bar 15.

Further, this die clamping apparatus includes driving means (an auxiliary cylinder 47, a piston 49) for advancing and retreating the ram 13 when each of the die clamping cylinders 11 is not under pressure (under atmospheric pressure), tie bar position detecting means (a position sensor 55, a scale 57) for detecting an individual position in the movement direction of each of the tie bars 15, and moving die plate position detecting means (a position sensor 41, a scale 43) for detecting a position in the movement direction of the moving die plate 9. The relative position of the half nuts 29 and the tie bar 15 is calculated individually based on the detection signal sent form these detecting means, and thus the aforementioned driving means (not shown) is controlled so that the half nuts 29 are engaged with the ring grooves 15a in the tie bar 15. This control unit uses ordinary means, and therefore the description thereof is omitted.

DISCLOSURE OF THE INVENTION

In the device for adjustment to die thickness in the conventional die clamping apparatus, as shown in FIG. 4, since many construction parts are installed on the outside of the fixed tie plate 5, the manufacturing cost is high. Also, before the pressure is increased to clamp the die, it is necessary to move the tie bars 15 to the right in FIG. 4 in advance by sending a pressure oil into the die clamping cylinder 11 in order to eliminate a gap between the ring grooves 15a in the die bar 15 and the ring grooves in the half nuts 29. However, the die clamping cylinder 11 of the die clamping apparatus is generally formed so as to have a large diameter because it must provide a high clamping force, so that it is necessary to supply a large quantity of pressure oil to operate the die clamping cylinder 11. Therefore, there arises a problem in that useless time is produced during the time from when the pressure oil is poured to when the tie bar moves.

Accordingly, an object of the present invention is to provide a die clamping apparatus in which the number of construction parts is small, so that the apparatus can be manufactured at a low cost, and also to provide a die clamping apparatus, a die clamping method, and a method for adjustment to die thickness using the apparatus, in which useless time for eliminating a gap between the ring grooves in the tie bar and the engagement teeth of the half nuts can be reduced a loss of time in the adjustment to die thickness necessary when the die is replaced.

To achieve the above object, the present invention provides a die clamping apparatus comprising a fixed die plate for holding a fixed die; a moving die plate for holding a moving die; displacing means for advancing and retreating the moving die plate with respect to the fixed die plate; and die clamping means, which is incorporated in either one of the fixed die plate and the moving die plate, for coupling and pressing the moving die plate to the fixed die plate via a tie bar, wherein the die clamping means is provided with a die clamping cylinder consisting of two stages of a large-diameter cylinder and a small-diameter cylinder, and a ram formed into two stages of a large-diameter ram and a small-diameter ram; the large-diameter ram is inserted in the large-diameter cylinder, and the small-diameter ram is inserted in the small-diameter cylinder; the proximal end portion of the tie bar is connected directly to the small-diameter ram; a large oil chamber is provided on each side of the large-diameter ram, and a small oil chamber is provided on the tie bar connection side of the small-diameter ram; and oil pressure supply means is provided which appropriately supplies an oil pressure to the large oil chamber and the small oil chamber in the die clamping cylinder to appropriately move the tie bar.

Also, the present invention provides a die clamping method in which using the above-described die clamping apparatus, a pressure oil is supplied to the small oil chamber to move the tie bar, and after an engagement gap between the half nuts and the tie bar is eliminated, a pressure oil is supplied to the small oil chamber and the large oil chamber on the small ram side to create a die clamping force.

Further, the present invention provides a method for adjustment to die thickness, in which when adjustment to die thickness is made using the above-described die clamping apparatus, the ram is located at a position of limit end to which the ram can be moved, and after the pressures in the large oil chambers on both sides of the large-diameter ram are decreased, a pressure oil is supplied to the small oil chamber to move the ram in the die clamping direction, by which the tie bar is located at a position at which the ring grooves in the tie bar engage properly with the ring grooves in the half nuts.

BEST MODE FOR CARRYING OUT THE INVENTION

An embodiment of a die clamping apparatus in accordance with the present invention will be described with reference to the accompanying drawings.

Figure 1:
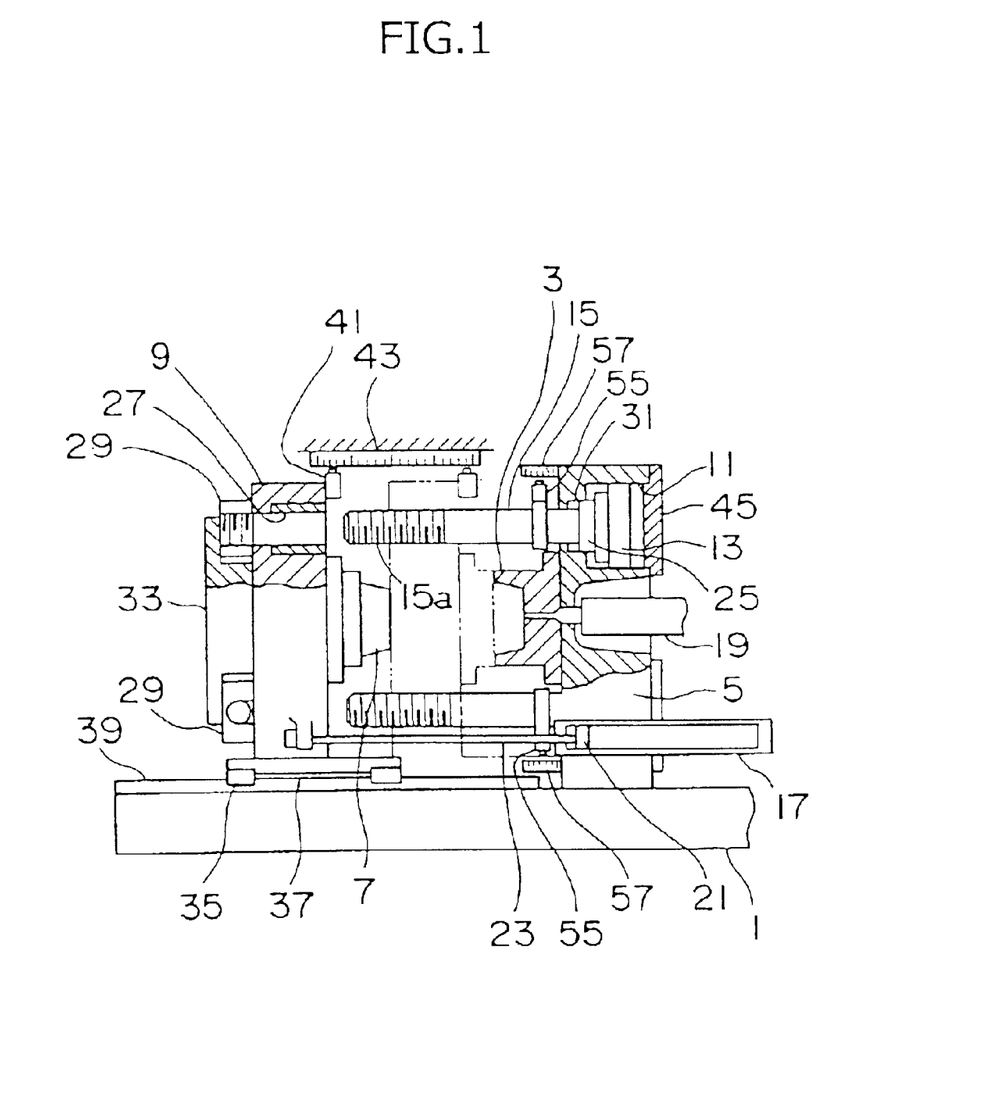
FIG. 1 is a partially sectioned side view showing one embodiment of an injection molding machine provided with a die clamping apparatus in accordance with the present invention.
Figure 2:
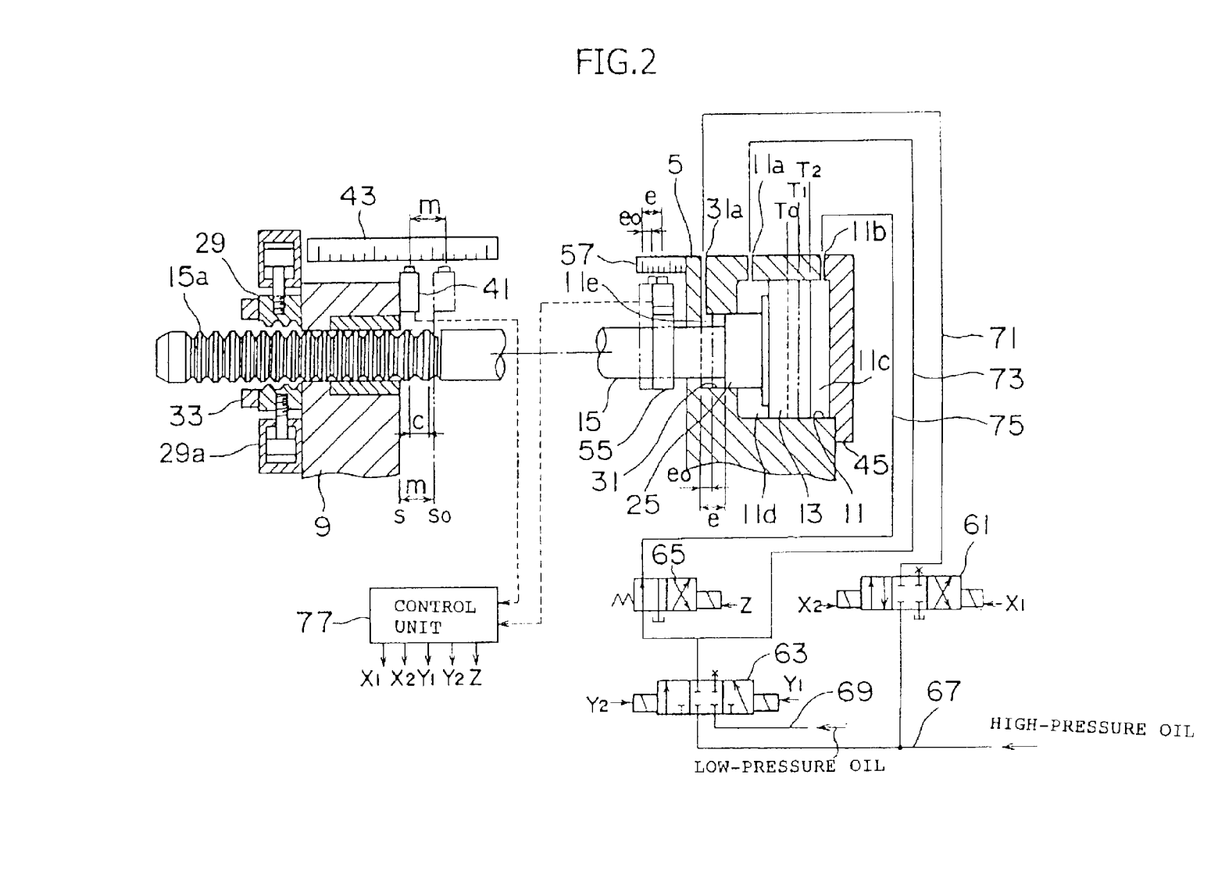
FIG. 2 is a view showing means for detecting positions of a moving die plate and a tie bar shown in FIG. 1 by an enlarged cross section, and also showing a hydraulic system for supplying a oil pressure to a die clamping cylinder provided in a fixed die plate.

FIGS. 1 and 2 show an injection molding machine provided with a die clamping apparatus of this embodiment. For convenience of explanation, in FIGS. 1 and 2, the same reference numerals are applied to elements which are the same as those shown in FIG. 4.

The injection molding machine of this embodiment has a support frame 1, and a fixed die plate 5 for installing a fixed die 3 is fixedly provided on the support frame 1 (see FIG. 1). Also, a moving die plate 9 for installing a moving die 7 is provided on the support frame 1 so as to face the fixed die plate 5. Further, rails 39 are fixedly provided on the support frame 1 so that linear bearings 35 are guided by the rails 39. The linear bearings 35 support the moving die plate 9 via a base 37. Thereby, the moving die plate 9 can be moved on the support frame 1 along the rails 39.

The fixed die plate 5 is provided with a plurality of hydraulic die clamping cylinders (four in the example, but needless to say, the number of cylinders is not limited to this number). Each of the die clamping cylinders is formed into two stages of a large-diameter cylinder 11 with a short stroke and a small-diameter cylinder 31. In response to this, a ram inserted in the die clamping cylinder is formed into two stages of a large-diameter ram 13 and a small-diameter ram 25. The large-diameter ram 13 slidingly moves in the large-diameter cylinder 11, and the small-diameter ram 25 slidingly moves in the small-diameter cylinder 31. To the center of the small-diameter ram 25, the proximal end portion of a tie bar 15 is directly connected. On the other hand, the moving die plate 9 is formed with insertion holes 27 for the tie bars 15. Therefore, when the moving die plate 9 approaches the fixing die plate 5 for the purpose of die closure, the tie bar 15 can penetrate the insertion hole 27. In the distal end portion of the tie bar 15, a plurality of ring grooves (or a thread groove) 15a are formed.

On both side of the large-diameter ram 13 in the large-diameter cylinder 11, large-diameter oil chambers (hereinafter referred to as large oil chambers) 11c and 11d are formed. Also, on the left-hand side in FIG. 2 of the small-diameter ram 25 in the small-diameter cylinder 31, a small-diameter oil chamber (hereinafter referred to as a small oil chamber) 11e is formed. An opening on the right-hand side of the large-diameter cylinder 11 is closed tightly by a cover 45.

The tie bar 15 is provided with a position sensor 55, and the fixed die plate 5 is provided with a scale 57 having a detection scale groove or a detection scale magnet. By the position sensor 55 and the scale 57, die bar position detecting means which detects the positions of the large-diameter ram 13 and the tie bar 15 and the travel distance of the tie bar 15 is formed.

Also, the moving die plate 9 is provided with a position sensor 41, and a scale 43 having a detection scale groove or a detection scale magnet is fixedly provided on a member installed to the support frame 1. By the position sensor 41 and the scale 43, moving die plate position detecting means which detects the position and travel distance of the moving die plate 9 is formed.

At one side of the fixed die plate 5 is fixedly provided a hydraulic moving cylinder 17. The proximal end portion of a rod 23 is connected directly to a piston 21 in the moving cylinder 17, and the distal end of the rod 23 is fixed to the side face of the moving die plate 9.

The moving die plate 9 is provided with half nuts 29 which engage with the ring grooves 15a in the tie bar 15 so that the center thereof coincides with the axis of the insertion hole 27. The half nuts 29, which are a so-called split nut divided into plural numbers in the circumferential direction, are configured so as to be opened and closed by a hydraulic cylinder 29a or the like (see FIG. 2) disposed at right angles to the axis of the insertion hole 27 (that is, in the radial direction of the insertion hole 27). Further, on the outside face of the moving die plate 9, a support member 33 for supporting the half nuts 29 is provided.

The support member 33 supports the half nuts 29 to prevent the half nuts 29 from separating from the moving die plate 9, for example, when the tie bar engaging with the closed half nuts is pushed in the left direction in FIG. 1 by an oil pressure applied onto the head side of the large-diameter ram 13 for the purpose of die opening etc.

In FIG. 1, reference numeral 19 denotes an injection cylinder, and the two-dot chain line indicates the position of the moving die plate 9 in the state of die closure.

In FIG. 2, a detecting section for detecting a relative position of the moving die plate 9 and the tie bar 15 is enlargedly shown. Also, a part of an oil pressure control system for the die clamping cylinder and a control unit 77 for controlling the positions of the rams 13 and 25 through the oil pressure control system.

This oil pressure control system has oil pressure supply means including oil pressure switching valves 61, 63 and 65, a low hydraulic power source (not shown), and a high hydraulic power source (not shown). The oil pressure switching valve 61 is a four-way switching electromagnetic valve having a block port for supplying a pressure oil to the small-diameter cylinder 31. One port of the oil pressure switching valve 61 is connected with a high-pressure oil pipe 67, and the other port thereof is connected with an oil pipe 71. The oil pipe 71 is connected to a port 31a in the fixed die plate 5 communicating with the small oil chamber 11e in the small-diameter cylinder 31.

The oil pressure switching valve 63 is a three-way switching electromagnetic valve having a block port for supplying a high-pressure oil (for example, 175 kgf/cm$^2$) from the high-pressure oil pipe 67 or a low-pressure oil (for example, 40 kgf/cm$^2$) from a low-pressure oil pipe 69 to the large-diameter cylinder 11 by switching. The oil pressure switching valve 65 is a three-way switching electromagnetic valve which applies a die clamping force and a die opening force to the large-diameter ram 13 by switching the oil pressures in the large oil chambers 11c and 11d on both sides of the large-diameter ram 13 in the large-diameter cylinder 11. An oil pipe 73 is connected to a port 11a communicating with the large oil chamber 11d on the die clamping side (left-hand side in FIG. 2) of the large-diameter cylinder 11. An oil pipe 75 is connected to a port 11b communicating with the large oil chamber 11c on the die opening side (right-hand side in FIG. 2) of the large-diameter cylinder 11.

In the above-described oil pressure control system, when a pressure oil is sent to the oil pipes 73 and 75 through the oil pressure switching valve 63, if an electromagnetic coil Z of the oil pressure switching valve 65 is excited to operate the oil pressure switching valve 65 in the pressure oil discharge direction, in FIG. 2, the oil pressure in the large oil chamber 11c on the right-hand side of the large-diameter ram 13 in the large-diameter cylinder 11 becomes only a slight back pressure (for example, 1 kgf/cm$^2$). Therefore, the pressure oil acts on the left-side face of the large-diameter ram 13, so that a die clamping force, which is a force in the right direction in FIG. 2, is created. On the other hand, when the electromagnetic coil Z of the oil pressure switching valve 65 is non-exited, the oil pressure switching valve 65 operates in the direction such as to cause a pressure oil to flow, so that the same oil pressure acts on both side faces of the large-diameter ram 13 in the large-diameter cylinder 11. At this time, however, the oil pressure acting area (area subjected to pressure) on the left-hand side of the large-diameter ram 13 is smaller than that on the right-hand side thereof by the area of the small-diameter ram 25, so that an oil pressure acting force in the die opening direction (the left direction in FIG. 2) of the large-diameter ram 13 is increased by a difference in oil pressure acting area between both side faces of the large-diameter ram 13, whereby a die opening force is created on the large-diameter ram 13.

Next, the sequence of injection molding performed by using the above-described embodiment will be explained.

First, a die that serves as a reference (hereinafter referred to as a reference die) is installed to each of the fixed die plate 5 and the moving die plate 9. Next, the moving die plate 9 is moved by the moving cylinder 17, by which the die 7 is closed. The position at which the die is closed is taken as a reference position $S_0$ of the moving die plate 9, and the position of the scale 43 detected by the position sensor 41 of the moving die plate 9 is taken as an initial point 0 for calculation. The reference position $S_0$ and the initial point 0 are stored in the control unit 77. Then, in the reference position $S_0$, the position of the large-diameter ram 13 is calculated from the distance from the attachment face of the die 7 of the moving die plate 9 to the position of ring groove in the half nuts 29 and the distance from the right end portion of the large-diameter ram 13 in FIG. 2 to the position of the ring groove 15a in the tie bar 15 so that the tie bar 15 and the half nuts 29 are engaged properly with each other, and the calculated position is taken as a reference position $T_0$ of the large-diameter ram 13. The position $T_0$ is stored in the control unit 77 as the initial point 0 for the calculation of the tie bar position detecting position sensor 55.

At the time of operation of the injection molding machine, first, as shown in FIG. 2, the oil pressure switching valve 63 is operated to a position at which a pressure oil does not flow (hereinafter referred to as a block position), and the oil pressure switching valve 65 is operated in the direction in which a pressure oil flows by making the electromagnetic coil Z non-excited. Thereby, the difference in oil pressure between the large oil chambers 11c and 11d on both sides of the large-diameter ram 13 in the large-diameter cylinder 11 is made zero. In this state, an electromagnetic coil $X_2$ of the oil pressure switching valve 61 is excited, by which a high-pressure oil is sent to the port 31a. Thereby, the small-diameter ram 25 in the small-diameter cylinder 31 is pushed by the high-pressure oil, so that the small-diameter ram 25 is retreated (moved in the right direction in FIG. 2) together with the large-diameter ram 13. Next, when the large-diameter ram 13 arrives at a reference position $T_1$, an electromagnetic coil $X_1$ is excited to make the oil pressure switching valve 61 in the block position, and the large-diameter ram 13 is stopped at the reference position $T_1$. In this state, the moving die plate 9 is moved to close the die.

At this time, the large-diameter ram 13 is located at a position at which the half nuts 29 just engage with the ring grooves 15a in the tie bar 15. Therefore, by moving the half nuts 29 toward the axis thereof by the hydraulic cylinder 29a, the half nuts 29 can be engaged with the ring grooves 15a in the tie bar 15 (see FIG. 2).

At this time, since a small gap exists between the ring grooves in the half nuts 29 and the ring grooves 15a in the tie bar 15, after the half nuts 29 are engaged with the ring grooves 15a, the electromagnetic coil $X_2$ of the oil pressure switching valve 61 is excited to send a high-pressure oil to the port 31a. Thereby, the small-diameter ram 25 is pushed by the oil pressure in the small-diameter cylinder 31, by which the tie bar 15 is pulled in the right direction. Therefore, the engagement gap between the ring grooves 15a in the tie bar 15 and the half nuts 29 is eliminated, and also a gap between the half nuts 29 and the moving die plate 9 and other gaps are eliminated.

Thus, by supplying a pressure oil into the small oil chamber 11e in the small-diameter cylinder 31, the engagement gap between the tie bar 15 and the half nuts 29 is eliminated, by which the aforementioned gap can be eliminated by using a smaller quantity of hydraulic oil without the use of a large-diameter die clamping cylinder. Moreover, the tie bar 15 can be coupled to the half nuts 29 without a gap in a short period of time, so that a mechanical shock occurring at the time of die clamping can be restrained.

The operation to perform die clamping is as described below.

First, the electromagnetic coil Z of the oil pressure switching valve 65 is excited to operate the oil pressure switching valve 65 in the direction such as to stop a pressure oil. Next, an electromagnetic coil $Y_2$ of the oil pressure switching valve 63 is excited to operate the oil pressure switching valve 63 so as to cause a high-pressure oil to flow, by which the high-pressure oil is sent to the large oil chamber 11d on the tie bar side of the large-diameter ram 13 in the large-diameter cylinder 11. At the same time, the electromagnetic coil $X_2$ of the oil pressure switching valve 61 is excited to operate the oil pressure switching valve 61 so as to cause the high-pressure oil to flow, by which the high-pressure oil is sent to the small-diameter cylinder 31. Thereby, the tie bar 15 is pulled toward the fixed die plate 5 with a high force, so that the die clamping operation is performed.

After the die clamping operation is finished, a product is taken out as described below.

First, the electromagnetic coil $X_1$ of the oil pressure switching valve 61 is excited to make the internal pressure of the small-diameter cylinder 31 zero (atmospheric pressure), and an electromagnetic coil $Y_1$ of the oil pressure switching valve 63 is excited to operate the oil pressure switching valve 63 so as to communicate with the low-pressure oil pipe 69. At the same time, the electromagnetic coil Z of the oil pressure switching valve 65 is made non-exited to operate the oil pressure switching valve 65 so as to cause the pressure oil to flow. Thereby, the pressures on both sides of the large-diameter cylinder 11 is made equal. As a result, by the difference in oil pressure acting area of the large-diameter ram 13 between the large oil chamber 11c and the large oil chamber 11d, the large-diameter ram 13 is moved in the die opening direction (the left direction in FIG. 2). Thereby, the die can be opened slightly in a state in which the tie bar 15 is fixed by the half nuts 29. Thereafter, the half nuts 29 are opened to release the connection between the half nuts 29 and the tie bar 15, and the moving die plate 9 is moved in the direction such as to separate from the fixed die plate 5 by the moving cylinder 17, by which the product is taken out by using a take-out robot or the like (not shown).

Before the next die clamping operation is started, the following operation is performed.

Figure 3:
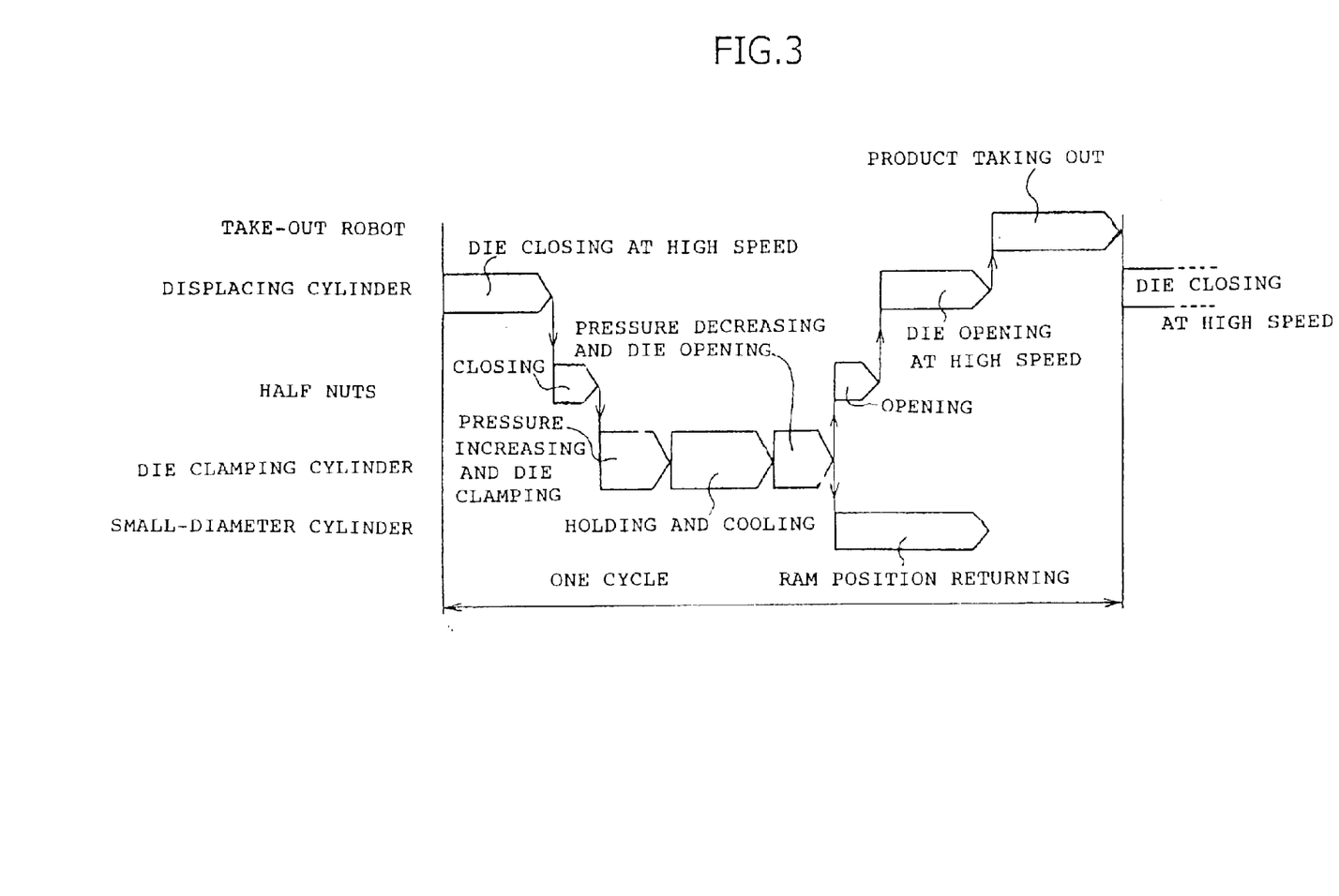
FIG. 3 is a block diagram showing a die clamping process in the injection molding machine shown in FIG. 1.

First, the oil pressure switching valve 63 is made in the block position (position at which the pressure oil does not flow). Next, the oil switching valve 65 is operated so as to cause the pressure oil to flow to open a passage between the large oil chamber 11c and the large oil chamber 11d on both sides of the large-diameter ram 13, by which the difference in pressure between the large oil chamber 11c and the large oil chamber 11d is made zero. Furthermore, the electromagnetic coil $X_2$ of the oil pressure switching valve 61 is excited to switch over the oil pressure switching valve 61 to the direction such as to send the high-pressure oil to the port 31a. As a result, the small-diameter ram 25 is pushed in the right direction in FIG. 2 by the pressure oil in the small oil chamber 11e in the small-diameter cylinder 31. Thereafter, when the large-diameter ram 13 is located at the reference position $T_1$, the electromagnetic coil $X_1$ of the oil pressure switching valve 61 is excited to make the interior of the small-diameter cylinder 31 at atmospheric pressure. Subsequently, by the same operation as described above, the next die clamping operation can be performed. The flow of work in such a die clamping process is shown in a block diagram of FIG. 3.

In FIG. 2, the position $S_o$ indicated by the two-dot chain line is a position of the moving die plate 9 for fastening the half nuts 29 when the reference dies are installed to the die plates 5 and 9. At this time, the moving die plate 9 is in the state in which the movement for die closure is finished and the die clamping operation is not yet started. On the other hand, the large-diameter ram 13 is located at the position $T_1$, which position is indicated by the two-dot chain line designating the face on the side opposite to the small-diameter ram 25 (on the right side in FIG. 2).

Next, a case where the die is replaced with another die with a thickness different from that of the reference die (hereinafter referred to as a replacement die) will be explained.

In this case, since there is a possibility that the engagement of the ring grooves 15a in the tie bar 15 with the ring grooves in the half nuts 29 shifts, it is necessary to correct the shift of engagement pitch of the ring grooves 15a in the tie bar 15 to attain proper engagement. The position of the moving die plate 9 at this time is taken as S, and the position of the large-diameter ram 13 in the large-diameter cylinder 11 is taken as $T_2$. These positions S and $T_2$ are indicated by solid lines in FIG. 2.

In order to correct the shift of engagement pitch of the ring grooves 15a in the tie bar 15, a dimensional difference m in thickness between the reference die and the replacement die is first determined. This dimensional difference m is determined from the actually measured value of replacement die. Alternatively, it is determined as follows: a difference in position when the reference die and the replacement die are installed to the moving die plate 9 that is in the die closure state is detected on the scale 43 by the position sensor 41, and the detection result is calculated by the control unit 77. The dimensional difference m is divided by a pitch c of the ring grooves 15a, and a residual smaller than indivisible c is taken out. This residual is used as a correction value, and is stored in the control unit 77 as the position of the large-diameter ram 13.

This process is expressed by a formula as described below.

$$e = e_0 + m - n \times c \quad (\text{where } m - n \times c < c)$$

where, e: a gap between the large-diameter ram 13 and the left-side wall face of the large-diameter cylinder 11 produced when the replacement die is installed to the moving die plate 9 (at this time, the right-side end of the large-diameter ram 13 is located at the position $T_2$)

$e_0$: a gap between the large-diameter ram 13 and the left-side wall face of the large-diameter cylinder 11 produced when the reference die is installed to the moving die plate 9 (at this time, the right-side end of the large-diameter ram 13 is located at the position $T_1$)

n, n': integer

In FIG. 2, $T_0$ indicates a position of limit end to which the large-diameter ram 13 can be moved to the left side in the large-diameter cylinder 11.

When the moving die plate 9 moves from the reference position $S_0$ through the distance m, the left-side gape of the large-diameter ram 13 in the large-diameter cylinder 11 can be determined by the aforementioned formula. This calculation for determining e is performed by the control unit 77. The value e thus determined is stored in the control unit 77, and before the next die clamping operation is started, the tie bar 15 is moved in the right direction in FIG. 2 through a distance of e. When the injection molding machine is operated, the value detected by the scale 57 is compared with this value e. When these values become equal to each other, the large-diameter ram 13 is stopped.

A stroke of ram in the large-diameter cylinder 11 that is at least twice the pitch c of the ring grooves 15a in the tie bar 15 suffices because the operation can be performed. Also, in the method for adjustment to die thickness using the die clamping apparatus of this embodiment, the large-diameter ram 13 has only to be returned slowly to the position $T_2$ (or $T_1$) during the time from when the die opening by using the large-diameter cylinder 11 is finished to when the next die clamping operation is started, so that the supply of pressure oil to the small oil chamber 11e in the small-diameter cylinder 31 can be effected by using a low-capacity hydraulic power source.

Also, when the die clamping apparatus of this embodiment is operated, the large-diameter ram 13 has only to be returned to an arbitrary corrected position T (not shown) before the die clamping operation.

Further, in this embodiment, the opening position of the moving die plate 9 (a clearance between the moving die plate 9 and the fixed die plate 5) can be set by combining the position sensor 41 for detecting the position in the travel direction of the moving die plate 9, the scale 43, and the control unit 77.

Further, although the tie bar 15 is fastened to the half nuts 29 in the state of die closure in this embodiment, even in the state in which the moving die 7 and the fixed die 3 are open before the die is closed, if (e−m) is an integral multiple (n') of the ring groove pitch c as expressed by a formula of (e−m=n×c+n'×c), the tie bar 15 can be fastened to the half nuts 29. In this case, the distance between the moving die 7 and the fixed die 3 is n'×c.

As described above, in this embodiment, the fixed die plate 5 is provided with the two-stage die clamping cylinder consisting of the large-diameter cylinder 11 and the small-diameter cylinder 31 so that the two-stage ram consisting of the large-diameter ram 13 and the small-diameter ram 25 is slidingly moved in the die clamping cylinder, and the proximal end portion of the tie bar 15 is connected directly to the face on the moving die plate side of the small-diameter ram 25. On the other hand, the moving die plate 9 is provided with the insertion hole 27 for the tie bar 15, and the support member 33 for supporting the half nuts 29 is provided. This positional relationship may be changed as described below. The moving die plate 9 is provided with a two-stage die clamping cylinder consisting of a large-diameter cylinder and a small-diameter cylinder so that a two-stage ram consisting of a large-diameter ram and a small-diameter ram is slidingly moved in the die clamping cylinder, and the proximal end portion of the tie bar is connected directly to the face on the fixed die plate side of the small-diameter ram. On the other hand, the fixed die plate 5 is provided with an insertion hole for the tie bar, and a support member for supporting half nuts is provided.

Industrial Applicability

As described above, according to the present invention, the number of construction parts is small as compared with the construction of the conventional die clamping apparatus, so that the die clamping apparatus in accordance with the present invention can be manufactured at a low cost. Moreover, a large operation space can be provided on the side opposite to the die attachment face of the fixed die plate, so that the operability of the apparatus can be increased.

Further, the relative stop position of the moving die plate with respect to the tie bar can be selected freely, so that the apparatus can accommodate dies with various die thicknesses. Moreover, since the tie bar can be engaged with the ring grooves (or thread groove) in the half nuts at any position, the apparatus achieves an effect that it can be used easily for injection compressing or cloth-laid molding.

Still further, in the present invention, even if a small gap exists between the ring grooves of half nuts and the ring grooves of tie bar after they are engaged with each other, the oil pressure switching valve is switched over again in the state in which the large-diameter cylinder is under no pressure to send a high-pressure oil to the small-diameter cylinder, and the tie bar is pulled by using the small-diameter ram in the small-diameter cylinder, by which the gap in the aforementioned engagement is eliminated. Therefore, the operation for eliminating the gap can be performed with a small quantity of pressure oil as compared with the case where the gap is eliminated by pulling the tie bar using a large-diameter die clamping cylinder. Thus, the tie bar can be connected to the half nuts without a gap in a short period of time. Moreover, since a gap between the half nuts and the moving die plate and other gaps can be eliminated in a short period of time, useless time for eliminating a gap between the ring grooves in the tie bar and the engagement teeth of the half nuts caused by the adjustment to die thickness can be reduced, and further a mechanical shock occurring at the time of die clamping can be restrained.

What is claimed is:

1. A die clamping apparatus comprising:
   a fixed die plate configured to hold a fixed die;
   a moving die plate configured to hold a moving die;
   a displacing mechanism configured to advance and retreat said moving die plate with respect to said fixed die plate; and
   a die clamp incorporated in either one of said fixed die plate and said moving die plate, said die clamp configured to couple and press said moving die plate to said fixed die plate via a tie bar, said die clamp including a two-stage die clamp cylinder comprising a large-diameter cylinder and a small-diameter cylinder, and a two-stage ram comprising a large-diameter ram and a small-diameter ram, wherein said large-diameter ram is inserted in said large-diameter cylinder, and said small-diameter ram is inserted in said small-diameter cylinder, a proximal end portion of said tie bar is connected directly to said small-diameter ram, a large oil chamber being provided on each side of said large-diameter ram, and a small oil chamber being provided on a tie bar connection side of said small-diameter ram, a pressure acting area of said large oil chamber on an opposite side of said large diameter ram to said small diameter ram being larger than a pressure acting area of said large oil chamber on a same side of said large diameter ram as said small diameter ram; and
   an oil supply configured to supply oil under pressure to said large oil chamber and said small oil chamber in said die clamp cylinder to move said tie bar.

2. The die clamping apparatus according to claim 1, wherein
   a plurality of ring grooves with an equal pitch formed in a distal end portion of said tie bar;
   half nuts configured to engage with the ring grooves in said tie bar, said half nuts configured to regulate movement of said moving die plate, said half nuts disposed on said fixed die plate or said moving die plate which faces the die plate incorporating said die clamp;
   a tie bar position detector configured to detect a position of said tie bar;
   a moving die plate position detector configured to detect a position of said moving die plate; and
   a control unit configured to control supply of said oil under pressure to said small oil chamber from said oil pressure supply based on a detection signal sent from said tie bar position detector and said moving die plate position detector and said control unit configured to control a position of said ram so that said half nuts and said tie bar engage with each other.

3. The die clamping apparatus according to claim 1, wherein said oil supply comprises a first oil pressure switching valve configured to supply oil under high pressure to said small oil chamber or to stop the supply, a second oil pressure switching valve configured to selectively supply either oil under high pressure or oil under low pressure to said large oil chambers on both sides of said large-diameter ram or to stop the supply, and a third oil pressure switching valve configured to supply oil sent from said second oil pressure switching valve to the large oil chamber located on the side opposite to the small-diameter ram of said large-diameter ram or to stop the supply.

4. A die clamping method using the die clamping apparatus as described in claim 2, comprising the steps of:

eliminating an engagement gap between said half nuts and said tie bar by moving said tie bar, said tie bar moved by supplying said oil under pressure to said small oil chamber; and creating a die clamping force by supplying said oil under pressure to said small oil chamber and said large oil chamber on the small ram side.

5. A method for adjustment to die thickness using the die clamping apparatus as described in claim 2, comprising the steps of:

decreasing pressures in said large oil chamber on both sides of said large diameter ram when said ram is located at a limit of position to which said ram can be moved; and moving said tie bar to a position where said ring grooves in said tie bar can engage properly with said ring grooves in said half nuts, said tie bar moved by supplying said oil under pressure to said small oil chamber, said ram moved by said oil under pressure in the die clamping direction.

* * * * *